Figure 3:
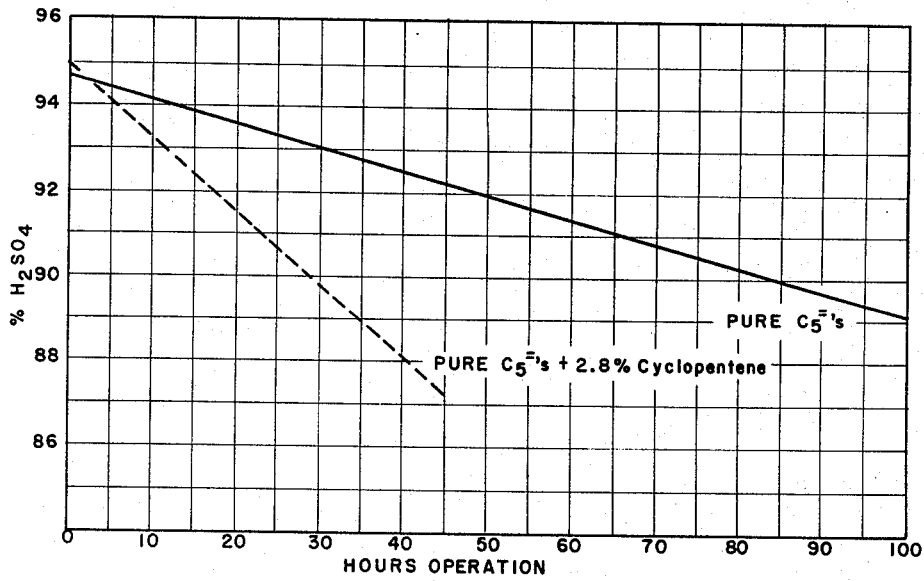

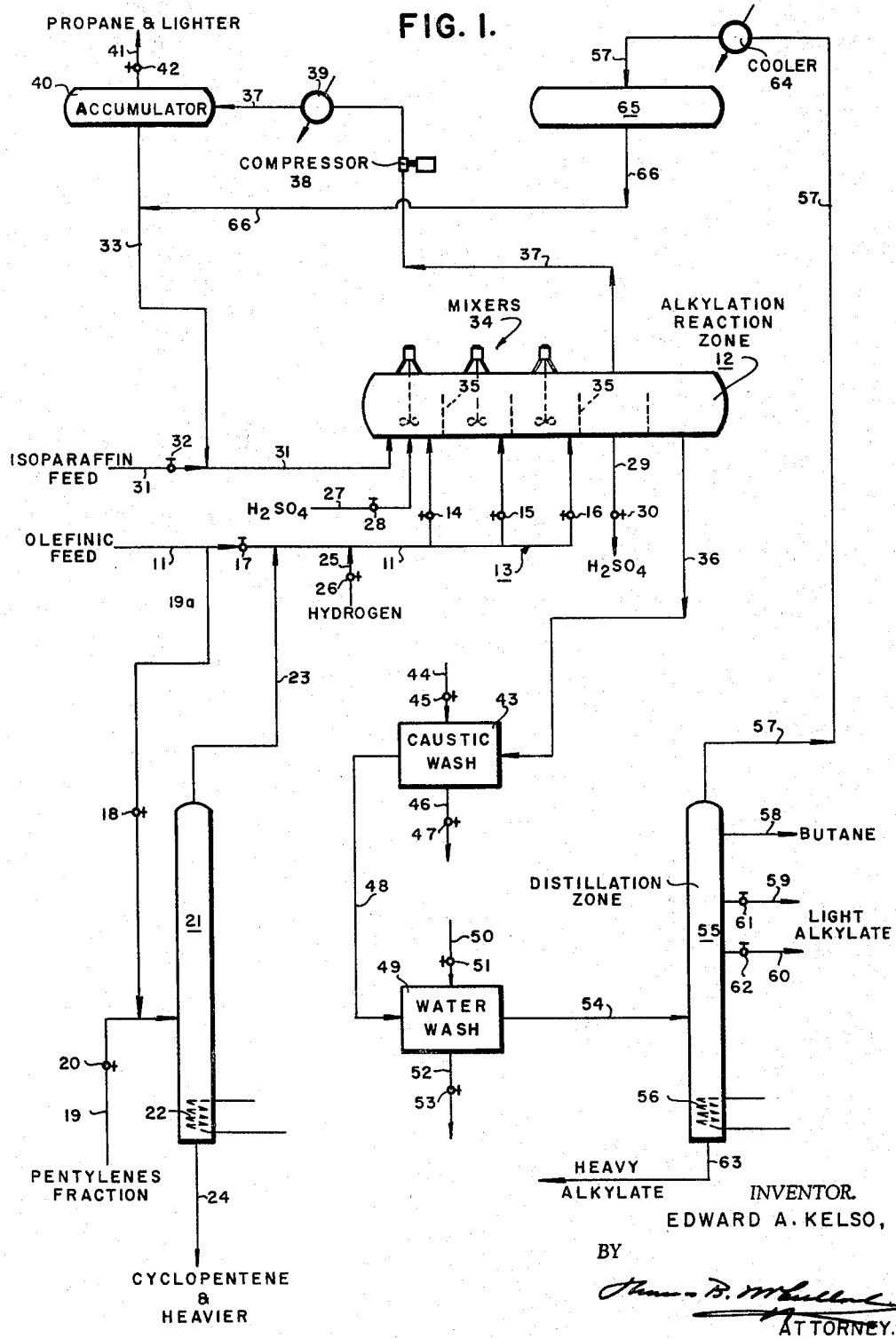

INVENTOR.
EDWARD A. KELSO,
BY
ATTORNEY.

United States Patent Office

3,170,002
Patented Feb. 16, 1965

3,170,002
REDUCTION OF ACID CONSUMPTION IN ALKYLATION
Edward A. Kelso, Baytown, Tex., assignor, by mesne assignments, to Esso Research and Engineering Company, Elizabeth, N.J., a corporation of Delaware
Filed June 19, 1963, Ser. No. 289,108
21 Claims. (Cl. 260—683.59)

The present invention is directed to sulfuric acid alkylation. More particularly, the invention is concerned with reduction of acid consumption in sulfuric acid alkylation of an isoparaffin with an olefin. In its more specific aspects, the invention is concerned with the decreasing of acid consumption in sulfuric acid catalyzed alylation wherein a contaminated monoolefin is employed.

The present invention may be briefly described as a method of decreasing acid consumption in the sulfuric acid catalyzed alkylation of an isoparaffin with a monoolefin fraction contaminated with a small amount of contaminants, including diolefin and cycloolefin, wherein the cycloolefin is selectively removed from the monoolefin. The isoparaffin is then alkylated with the cycloolefin-free monoolefin fraction under alkylation conditions in the presence of a small amount of free hydrogen effective to overcome the effect of the diolefin on acid consumption.

The present invention also involves decreasing acid consumption in sulfuric acid catalyzed alkylation wherein the alkylation reaction is conducted in the presence of a small amount of free hydrogen sufficient to overcome the deleterious effects of diolefin in the olefin feed.

The present invention also involves decreasing acid consumption in the sulfuric acid catalyzed alkylation of an isoparaffin with a monoolefin fraction contaminated with a small amount of cycloolefins wherein the cycloolefin is removed prior to alkylation. The cycloolefin may be removed by distillation of the mono-olefin fraction or by selective solvent extraction of the monoolefin fraction.

Temperatures employed in the alkylation may suitably range from about 0° F. to about 100° F., with a preferred temperature in the range from about 20° F. to about 60° F.

Pressures may range from about 0 to about 50 p.s.i.g. sufficient to maintain the reactants in liquid phase. Pressures in the range from about 5 to about 25 p.s.i.g. are satisfactory.

The sulfuric acid may have a strength from about 88 to about 99 percent by weight $H_2SO_4$, with a preferred $H_2SO_4$ concentration from about 95 to about 98 percent by weight.

The external weight ratio of isoparaffin to olefin may range from about 1:1 to about 10:1, with a preferred external ratio from about 2:1 to about 5:1. The internal isoparaffin-olefin ratio may range from about 10:1 to about 1000:1, with a preferred range of about 15:1 to about 100:1.

The space velocity of the olefin may range from about 0.05 to about 3.0 volumes of olefin per volume of acid per hour.

The monoolefin may suitably be a $C_4$ to $C_6$ monoolefin, such as propylene, butenes, pentenes, and hexenes, with butenes and pentenes being preferred.

The isoparaffins may suitably be the $C_4$ to $C_8$ iso paraffins, such as isobutane, isopentane, isohexane, isoheptane, and isooctane, with the isobutane and isopentane being preferred.

The amount of hydrogen employed on a molar basis is at least an equal molar basis to the dioelefin and may range from about 1:1 to about 10:1 to the diolefin content of the monoolefin fraction.

Where a solvent is employed to remove selectively cycloolefins from the monoolefin fraction, solvents such as phenol, furfural, sulfur dioxide, di- and tri-ethylene glycol, sulfolane, α-butyrolactone, and the like may be used.

Solvent extraction may be conducted at temperatures within the range from about −50° F. to about +200° F. and a solvent to monoolefin ratio from about 0.5 to about 20 may be employed.

Figure 2:
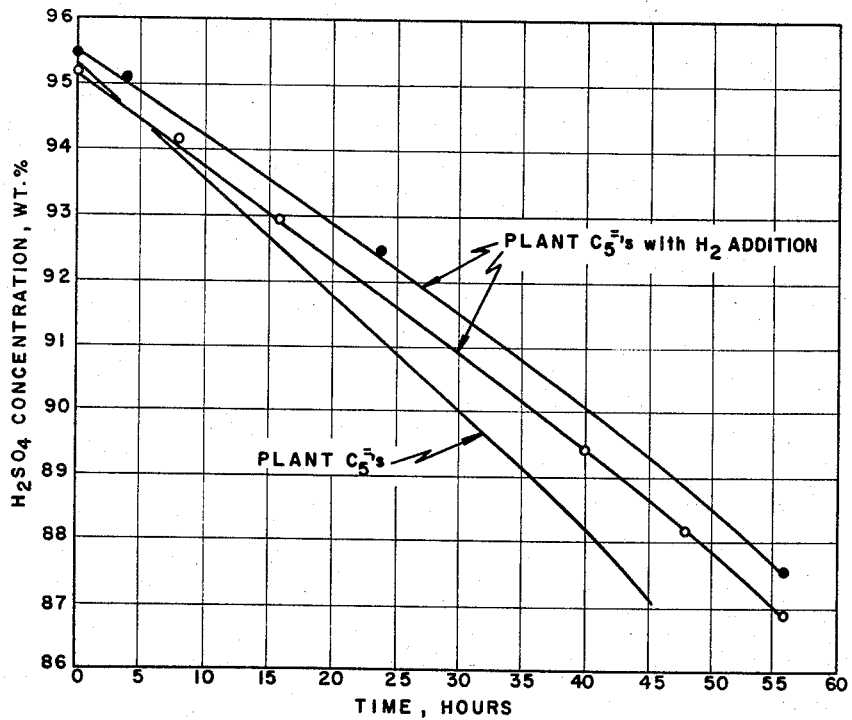

The present invention will be further illustrated by reference to the drawing in which
FIG. 1 is a flow diagram of a preferred mode;
FIG. 2 is a plot of data showing the relationship between acid strength and hours operation with the present invention; and
FIG. 3 is another plot of data showing the relationship between acid strength and hours operation for another mode of the present invention.

Referring now to the drawing and particularly to FIG. 1, numeral 11 designates a charge line by way of which a monoolefin feed is introduced into the system for discharging into an alkylation reaction zone 12 through a manifold 13, controlled by valves 14, 15, and 16.

In one aspect of the present invention, valve 17 in line 11 may be closed and valve 18 in branch line 19a may also be closed on an olefinic feed, such as $C_5$ monoolefin feed, introduced into the system by line 19, controlled by valve 20. The pentylenes fraction is introduced by line 19 into a fractional distillation zone 21 provided with suitable internal baffling equipment or packing for precise fractional distillation. Zone 21 is provided with a heating means, such as steam coil 22, line 23 for removal of an overhead fraction, and line 24 for discharge of cyclopentene and heavier hydrocarbons. The pentylenes are discharged by line 23 into line 11 in admixture with free hydrogen introduced by line 25, controlled by valve 26, and then introduced into alkylation reaction zone 12 through manifold 13. Sulfuric acid is also introduced into zone 12 by line 27, controlled by valve 28. This acid may comprise fresh sulfuric acid and recycle sulfuric acid withdrawn from zone 12 by line 29, controlled by valve 30, which will include acid emulsified in hydrocarbon reactants. A portion of the acid withdrawn by line 29 may be discarded to maintain acid strength.

Also introduced into reaction zone 12 is isoparaffin feed, such as isobutane, which is introduced by line 31, controlled by valve 32. This isoparaffin will include recycled isoparaffin, such as isobutane from line 33, the source of which will be described hereinafter.

Alkylation reaction zone 12 is provided with a plurality of stirring devices 34 comprised of a propeller actuated by a prime mover, such as an electric motor, through a shaft. Alkylation reaction zone 12 also is provided with internal baffles 35 between which the stirring devices 34 are located. The last two sections of the alkylation reaction zone are provided for acid and product withdrawal. The alkylate is withdrawn from alkylation reaction zone 12 by line 36 for further treatment as will be described.

The reaction temperature may be maintained in reaction zone 12 by withdrawing vaporized reactants by way of line 37 containing a compressor 38 and a cooler-condenser 39 which liquefies the withdrawn reactants. The withdrawn liquefied reactants are discharged into an accumulation zone 40 from whence propane and lighter gases may be discharged by line 41, controlled by valve 42. Liquefied reactants (predominantly isobutane) are recycled by line 33 to line 31 as described hereinbefore.

Alkylate product withdrawn from reaction zone 12 is introduced thereby into a caustic washing zone 43 into which a caustic solution, such as one having a strength of about 2 to 12° Baumè, which is introduced by line 44, controlled by valve 45; an 8° Baumè sodium hydroxide solution gives good results. The spent caustic solution is discharged from zone 43 by line 46, controlled by valve 47. The caustic washed alkylate is discharged from zone 43 by line 48 into a water-wash zone 49 into which water is introduced by line 50, controlled by valve 51. Wash water is discharged from zone 49 by line 52, controlled by valve 53.

The caustic and water-washed alkylate is then introduced by line 54 into a distillation zone 55 which is equipped similarly to distillation zone 21 with respect to internal vapor-liquid contacting means. Zone 55 is provided with a heating means, such as steam coil 56, line 57 for removal of an overhead fraction, line 58 for removal of a side stream butane fraction, and lines 59 and 60, controlled, respectively, by valves 61 and 62, for withdrawal of alkylate fractions. Heavy alkylate is discharged by line 63. Zone 55 may comprise a plurality of distillation towers with isobutane, normal butane, and light alkylate recovered as overhead fractions.

The overhead fraction withdrawn by line 57 is predominately isobutane and is introduced through a condenser-cooler 64 into an accumulation zone 65 for recycle by way of line 66 to line 33 for return to the alkylation reactor 12.

In the practice of the present invention it is contemplated that the olefinic feed may be introduced directly to reaction zone 12 by line 11 or through branch line 19a to line 19 or the feed fraction may be introduced directly by line 19 into distillation zone 21. In the situations where the olefinic feed does not contain cycloolefins, feed may be charged by line 11 directly to reaction zone 12, but if the feed contains cycloolefins, such as cyclopentene, it will be charged to distillation zone 21. Part of the isoparaffin feed may also be added to the olefin feed prior to charging to the mixing zones of reactor 12.

In the situations where the olefinic feed contains cycloolefins and acyclic- and cyclic-diolefins, the cycloolefins will be removed and hydrogen will be employed as has been described.

It is contemplated that instead of a distillation zone 21, a solvent extraction zone, alone or in combination with a distillation zone, may be used to remove the cycloolefins. Preferably, a distillation zone will be employed.

By virtue of employing a method such as described with respect to FIG. 1, it is possible to reduce acid consumption remarkably by removing substantially cycloolefins and by charging hydrogen with the olefinic feed to the alkylation reaction zone to overcome the deleterious effects of the diolefins in the feed.

In order to illustrate that cycloolefins may be removed, the following Table I presents the boiling points of the pentenes contained in a typical $C_5$ olefinic fraction which may be charged as the olefin in the method of the present invention:

| Compound: | B.P., °F. |
|---|---|
| 3-methyl-butene-1 | 68 |
| 2-methyl-butene-1 | 88 |
| Pentene-1 | 86 |
| 2-methyl-butene-2 | 100 |
| cis-Pentene-2 | 98.4 |
| trans-Pentene-2 | 97.1 |
| Cyclopentene | 120.6 |

In order to illustrate the present invention, a number of sulfuric acid catalyzed alkylation reactions were made with a commercial $C_5$ monoolefin fraction from a sulfuric acid alkylation plant which contained 0.8% by wt. dienes and with runs wherein free hydrogen was added to the alkylation reactor in accordance with the invention using the same feed containing 0.8% dienes. The compositions of the acyclic olefin portion of all the feeds were essentially the same. The results of these operations are presented in FIG. 2.

Referring to FIG. 2, it will be seen that with the plant pentene fraction containing 0.8% by weight of dienes, the acid strength had declined to about 87% $H_2SO_4$ after about 45 hours; whereas, when hydrogen was added to the alkylation reactor, an acid strength of 87% $H_2SO_4$ was reached at approximately 56 hours. In short, in accordance with the present invention, hydrocarbon reactants containing contaminants such as dienes and the like are treated in situ with free hydrogen in contact with sulfuric or other acid catalyst, thus eliminating the need for a pretreatment operation.

Referring now to FIG. 3, runs are presented with a pure pentene fraction and a pure pentene fraction containing 2.8% by volume of cyclopentene. It will be noted by reference to FIG. 3 that at 100 hours the acid strength for the pentene fraction had declined to 86.5% $H_2SO_4$; whereas, when cyclopentene was present, the acid strength declined to 87.2% $H_2SO_4$ at 45 hours operation.

The alkylation runs illustrating the effect contaminants have on $H_2SO_4$ catalyst consumption and alkylate quality, as stated above, were made using pentenes as the olefin and isobutane as the isoparaffin under the following alkylation conditions:

| | |
|---|---|
| Temperature, °F. | 45 |
| Pressure, p.s.i.g. | 75 |
| Vol. percent $H_2SO_4$ in emulsion | 60 |
| Isobutane: olefin ratio | 5.1 |
| Vol. olefin per vol. of acid/hour | 0.12 |

The results of these runs, which also are shown in FIGS. 2 and 3, are presented on a different basis in the following table:

Table II

| | Acid Consumption Lbs. Gunk[2]/ Gal. of $C_6$+Alkylate[1] | Alkylate Quality, Motor O.N. |
|---|---|---|
| Plant $C_5$⁼, 0.8% dienes, 1.2% cyclopentene | 0.16 | 89.1 |
| Plant $C_5$⁼, diene free | 0.12 | 89.9 |
| Plant $C_5$⁼, with $H_2$ in accordance with present invention | 0.13 | 89.6 |
| Synthetic $C_5$⁼ | 0.05 | 89.8 |
| Synthetic $C_5$⁼+2.8% cyclopentene | 0.14 | 89.1 |
| Plant $C_4$⁼ (0.3% $C_4$ dienes) | 0.05 | 94.8 |

[1] $C_6$+ alkylate yield was 1.5-1.6 gallon per gallon of olefin containing 86% light alkylate.
[2] Multiply by 13 to give pounds of 98% $H_2SO_4$ consumption per gallon of olefin.

From the data in the foregoing table, it is evident that the practice of the present invention allows the obtaining of results substantially identical to those obtained where a diolefin-free feedstock was used. Also, it is evident that cyclopentene contributes markedly to deterioration in quality of the product and in increased acid consumption.

It will be seen from the foregoing data that substantial improvements are obtained by introducing hydrogen into the sulfuric acid reaction zone with the olefin and by removing cyclopentenes from the feed.

It has been found in the practice of the present invention with a refinery $C_5$ olefin feed, one-fifth of the excess acid consumption when pentenes are alkylated as compared to butylenes is due to the presence of dienes, and four-fifths of the excess acid consumption is due to the presence of cyclopentene. In this particular instance, the feed contained 0.8% dienes and 1.8% cyclopentenes.

While the invention has been described and illustrated with respect to $H_2SO_4$ catalyzed alkylation, the invention is also applicable to other acid catalyzed reactions such as those employing $AlCl_3$, other Friedel-Crafts catalysts such as $AlBr_3$, chlorosulfonic acid and fluorosulfonic acid, and the like. Generally speaking, the invention is applicable to operations where the presence of diolefins and/or cycloolefins is deleterious to the catalytic reaction.

The nature and objects of the present invention having been completely described and illustrated and the best mode contemplated in carrying out the invention set forth, what I wish to claim as new and useful and secure by Letters Patent is:

1. A method of decreasing acid consumption in the sulfuric acid catalyzed alkylation of an isoparaffin with a monoolefin contaminated with a small amount of a diolefin which comprises conducting said alkylation under alkylation conditions in the presence of a small amount of free hydrogen effective to overcome the effect of said diolefin on acid consumption.

2. A method in accordance with claim 1 in which the hydrogen is employed in an equal molar basis to the amount of diolefin.

3. A method in accordance with claim 1 in which the molar ratio of hydrogen to diolefin is from about 1:1 to about 10:1.

4. A method of decreasing acid consumption in the sulfuric acid catalyzed alkylation of an isoparaffin having 4 to 8 carbon atoms in the molecule with a $C_4$ to $C_6$ monoolefin contaminated with a small amount of a diolefin which comprises conducting said alkylation under alkylation conditions in the presence of a small amount of free hydrogen effective to overcome the effect of said diolefin on acid consumption.

5. A method in accordance with claim 4 in which the isoparaffin is isobutane and the monoolefin is a $C_4$ fraction.

6. A method in accordance with claim 4 in which the isoparaffin is isobutane and the monoolefin is a $C_5$ fraction.

7. A method of decreasing acid consumption in the sulfuric acid catalyzed alkylation of an isoparaffin with a $C_5$ monoolefin fraction contaminated with a small amount of cyclopentene which comprises substantially removing cyclopentene from said $C_5$ monoolefin and then alkylating said isoparaffin with said $C_5$ monoolefin substantially free of cyclopentene.

8. A method in accordance with claim 7 in which the cyclopentene is removed by distillation of said $C_5$ fraction.

9. A method in accordance with claim 7 in which the cyclopentene is removed by extraction of said $C_5$ fraction with a solvent selective for removal of said cyclopentene.

10. A method of decreasing acid consumption in the sulfuric acid catalyzed alkylation of an isoparaffin with a monoolefin fraction contaminated with a small amount of contaminants including diolefin and cycloolefin which comprises substantially selectively removing cycloolefin from said monoolefin fraction and then alkylating said isoparaffin with said substantially cycloolefin-free monoolefin fraction under alkylation conditions in the presence of a small amount of free hydrogen effective to overcome the effect of said diolefin on acid consumption.

11. A method in accordance with claim 10 in which the hydrogen is employed in an equal molar basis to the amount of diolefin.

12. A method in accordance with claim 10 in which the molar ratio of hydrogen to diolefin is from about 1:1 to about 10:1.

13. A method in accordance with claim 10 in which the cycloolefin is removed by distillation of said monoolefin fraction.

14. A method in accordance with claim 10 in which the cycloolefin is removed by extraction of said monoolefin fraction with a solvent selective for removal of said cycloolefin.

15. A method of treating a hydrocarbon fraction contaminated with a contaminating amount of a diolefin which comprises contacting said hydrocarbon fraction with sulfuric acid in the presence of a small amount of free hydrogen effective to overcome the contaminating effect of said diolefin.

16. A method in accordance with claim 15 in which the hydrocarbon fraction is a monoolefin fraction having 3 to 6 carbon atoms in the molecule.

17. A method of treating a hydrocarbon fraction contaminated with a contaminating amount of a diolefin which comprises contacting said hydrocarbon fraction with an acid catalyst selected from the group consisting of sulfuric acid, chlorosulfonic acid, fluorosulfonic acid, aluminum chloride, and aluminum bromide in the presence of a small amount of free hydrogen effective to overcome the contaminating effect of said diolefin.

18. A method in accordance with claim 17 in which the hydrocarbon fraction is a monoolefin fraction having 3 to 6 carbon atoms in the molecule.

19. A method of treating a hydrocarbon fraction contaminated with a contaminating amount of an olefinic hydrocarbon selected from the group consisting of diolefins and cycloolefins which comprises contacting said hydrocarbon fraction with sulfuric acid in the presence of a small amount of free hydrogen effective to overcome the contaminating effect of said olefinic hydrocarbon.

20. A method of treating a hydrocarbon fraction contaminated with a contaminating amount of an olefinic hydrocarbon selected from the group consisting of diolefins and cycloolefins which comprises contacting said hydrocarbon fraction with an acid catalyst selected from the group consisting of sulfuric acid, chlorosulfonic acid, fluorosulfonic acid, aluminum chloride, and aluminum bromide in the presence of a small amount of free hydrogen effective to overcome the contaminating effect of said olefinic hydrocarbon.

21. A method of decreasing acid catalyst consumption in the acid catalyzed alkylation of an isoparaffin with a monoolefin contaminated with a small amount of a diolefin which comprises conducting said alkylation under alkylation conditions with a catalyst selected from the group consisting of sulfuric acid, chlorosulfonic acid, fluorosulfonic acid, aluminum chloride, and aluminum bromide in the presence of a small amount of free hydrogen effective to overcome the effect of said diolefin on acid consumption.

References Cited in the file of this patent

UNITED STATES PATENTS

| | | |
|---|---|---|
| 2,786,878 | Arundale et al. | Mar. 26, 1957 |
| 3,046,316 | Gudelis | July 24, 1962 |
| 3,050,456 | Melchin | Aug. 21, 1962 |
| 3,098,882 | Arnold | July 23, 1963 |
| 3,108,947 | Stijntjes | Oct. 29, 1963 |

FOREIGN PATENTS

| | | |
|---|---|---|
| 586,848 | Great Britain | Apr. 2, 1947 |